United States Patent
Goh et al.

(10) Patent No.: US 8,118,487 B2
(45) Date of Patent: Feb. 21, 2012

(54) AUTO-RANGING THERMISTOR-BASED TEMPERATURE DETECTION SYSTEM

(75) Inventors: JiunHeng Goh, Santa Clara, CA (US); Constantin Bucur, Santa Clara, CA (US)

(73) Assignee: O2Micro, Inc., Santa Clara, CA (US)

( * ) Notice: Subject to any disclaimer, the term of this patent is extended or adjusted under 35 U.S.C. 154(b) by 554 days.

(21) Appl. No.: 12/257,246

(22) Filed: Oct. 23, 2008

(65) Prior Publication Data

US 2009/0110028 A1    Apr. 30, 2009

Related U.S. Application Data

(60) Provisional application No. 61/001,442, filed on Oct. 31, 2007.

(51) Int. Cl.
*G01K 7/00* (2006.01)

(52) U.S. Cl. ........................... 374/185; 374/114

(58) Field of Classification Search .................. 374/185, 374/114

See application file for complete search history.

(56) References Cited

U.S. PATENT DOCUMENTS

| | | | | |
|---|---|---|---|---|
| 3,198,012 A * | 8/1965 | Argue et al. | | 374/185 |
| 3,216,249 A * | 11/1965 | Karlheinz | | 73/204.21 |
| 3,684,947 A * | 8/1972 | Evalds et al. | | 323/242 |
| 3,927,571 A * | 12/1975 | Athey | | 374/111 |
| 4,297,851 A * | 11/1981 | Paddock et al. | | 62/126 |
| 4,298,835 A * | 11/1981 | Rowe | | 323/281 |
| 4,441,545 A * | 4/1984 | Alley et al. | | 165/209 |
| 4,459,467 A * | 7/1984 | Bare et al. | | 219/413 |
| 5,436,614 A | 7/1995 | Torikoshi et al. | | |
| 5,453,682 A | 9/1995 | Hinrichs et al. | | |
| 6,342,997 B1 * | 1/2002 | Khadkikar et al. | | 361/103 |
| 7,791,424 B2 * | 9/2010 | Sutardja | | 331/158 |
| 2004/0105488 A1 | 6/2004 | Felder | | |
| 2004/0190175 A1 * | 9/2004 | Chey et al. | | 360/59 |
| 2004/0258116 A1 * | 12/2004 | Kim et al. | | 372/38.02 |
| 2006/0049172 A1 * | 3/2006 | Gagas et al. | | 219/521 |

FOREIGN PATENT DOCUMENTS

JP    6-186090 A    7/1994

* cited by examiner

*Primary Examiner* — Christopher Fulton (74) *Attorney, Agent, or Firm* — Arent Fox LLP (57) ABSTRACT

An apparatus for detecting temperature includes an adjustable current source operable for supplying a current, a thermistor coupled to said adjustable current source, and an auto-range hysteresis logic coupled to said thermistor and said adjustable current source operable for outputting a signal to control said adjustable current source by sensing a voltage across said thermistor. A method for detecting temperature is also disclosed.

22 Claims, 11 Drawing Sheets

AUTO-RANGING THERMISTOR-BASED TEMPERATURE DETECTION SYSTEM

CROSS-REFERENCE TO RELATED APPLICATIONS

Claim of Priority Under 35 U.S.C. §119

The present Application for Patent claims priority to Provisional Application No. 61/001,442 entitled "AUTO RANGING THERMISTOR DETECTION BLOCK," filed Oct. 31, 2007, and assigned to the assignee hereof and hereby expressly incorporated by reference herein.

BACKGROUND

I. Field

The following description relates generally to a thermal detection circuit, and more particularly to a circuit and method of auto-ranging thermal detection.

II. Background

Thermistors are widely used for detecting temperature in typical thermal protection circuits for electronic devices. A thermistor can be a positive temperature coefficient (PTC)-type or a negative temperature coefficient (NTC)-type. The resistance of a PTC-type thermistor increases as its temperature increases; and the resistance of an NTC-type thermistor decreases as its temperature increases. In either case, the resistance of either type of thermistor can be used to determine the temperature of the body of the thermistor, which is indicative of the environmental temperature, and to warn of either an over-temperature state or an under-temperature state if the resistance of the thermistor crosses a predetermined threshold.

Unfortunately, typical systems implementing thermistors to monitor environmental temperature have particular drawbacks. For detecting the variation in resistance of a thermistor, a typical approach is to couple a constant voltage source or a constant current source as an input to the thermistor. A comparator is used to compare the voltage measured across the thermistor to a threshold voltage level. As the resistance of the thermistor rises or falls due to a change in temperature, the measured voltage will also change as the current flowing through the thermistor does not. If the voltage of the thermistor reaches the threshold voltage level, the comparator will detect this and output a corresponding signal.

Because of the static nature constant current/voltage sources, and the range of change of the resistance of the thermistor being very large, the voltage sensed at the thermistor may not be large enough at certain limits of the full range of temperatures under which the circuit is supposed to operate when compared to an offset range of the comparator. This may result in reduced accuracy of temperature detection and ultimately could result in an over- or under-heated and damaged system. Consequently, it would be desirable to address one or more of the deficiencies described above.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to one aspect, an apparatus for detecting temperature includes an adjustable power source operable for supplying at least one of a current and a voltage; a thermistor coupled to the adjustable power source; and an auto-range hysteresis logic coupled to the thermistor and the adjustable power source, the auto-range hysteresis logic operable to output a signal to control the adjustable power source by sensing a thermistor voltage across the thermistor.

In another aspect, a method for detecting temperature includes supplying at least one of a current and a voltage to a thermistor at a first level via an adjustable power source; sensing a thermistor voltage across the thermistor; comparing the thermistor voltage with a first threshold and with a second threshold; and adjusting the at least one of the current and the voltage supplied to the thermistor by controlling the adjustable power source based on the comparison.

In another aspect, an apparatus for detecting temperature includes means for supplying at least one of a current and a voltage to a thermistor at a first level via an adjustable power source; means for sensing a thermistor voltage across the thermistor; means for comparing the thermistor voltage with a first threshold and with a second threshold; and means for adjusting the at least one of the current and the voltage supplied to the thermistor by controlling the adjustable power source based on the comparison.

In another aspect, an apparatus for detecting temperature includes an adjustable current source operable for supplying a current; a thermistor coupled to the adjustable current source; and an auto-range hysteresis logic coupled to the thermistor and the adjustable current source, the auto-range hysteresis logic operable to output a signal to control the adjustable current source by sensing a voltage across the thermistor.

In another aspect, an apparatus for detecting temperature includes an adjustable power source operable for supplying at least one of a current and a voltage at a first level; and a thermistor coupled to the adjustable power source; wherein the adjustable power source supplies the at least one of the current and the voltage at a second level by sensing a voltage across the thermistor.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

BRIEF DESCRIPTION OF THE DRAWINGS

These and other sample aspects of the invention will be described in the detailed description that follow, and in the accompanying drawings, wherein.

In accordance with common practice, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the invention are described more fully hereinafter with reference to the accompanying drawings. This invention may, however, be embodied in many different forms and should not be construed as limited to any specific structure or function presented throughout this disclosure. Rather, these aspects are provided so that this disclosure will be thorough and complete, and will fully convey the scope of the invention to those skilled in the art. Based on the teachings herein one skilled in the art should appreciate that that the scope of the invention is intended to cover any aspect of the invention disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect of the invention disclosed herein may be embodied by one or more elements of a claim.

Figure 1:
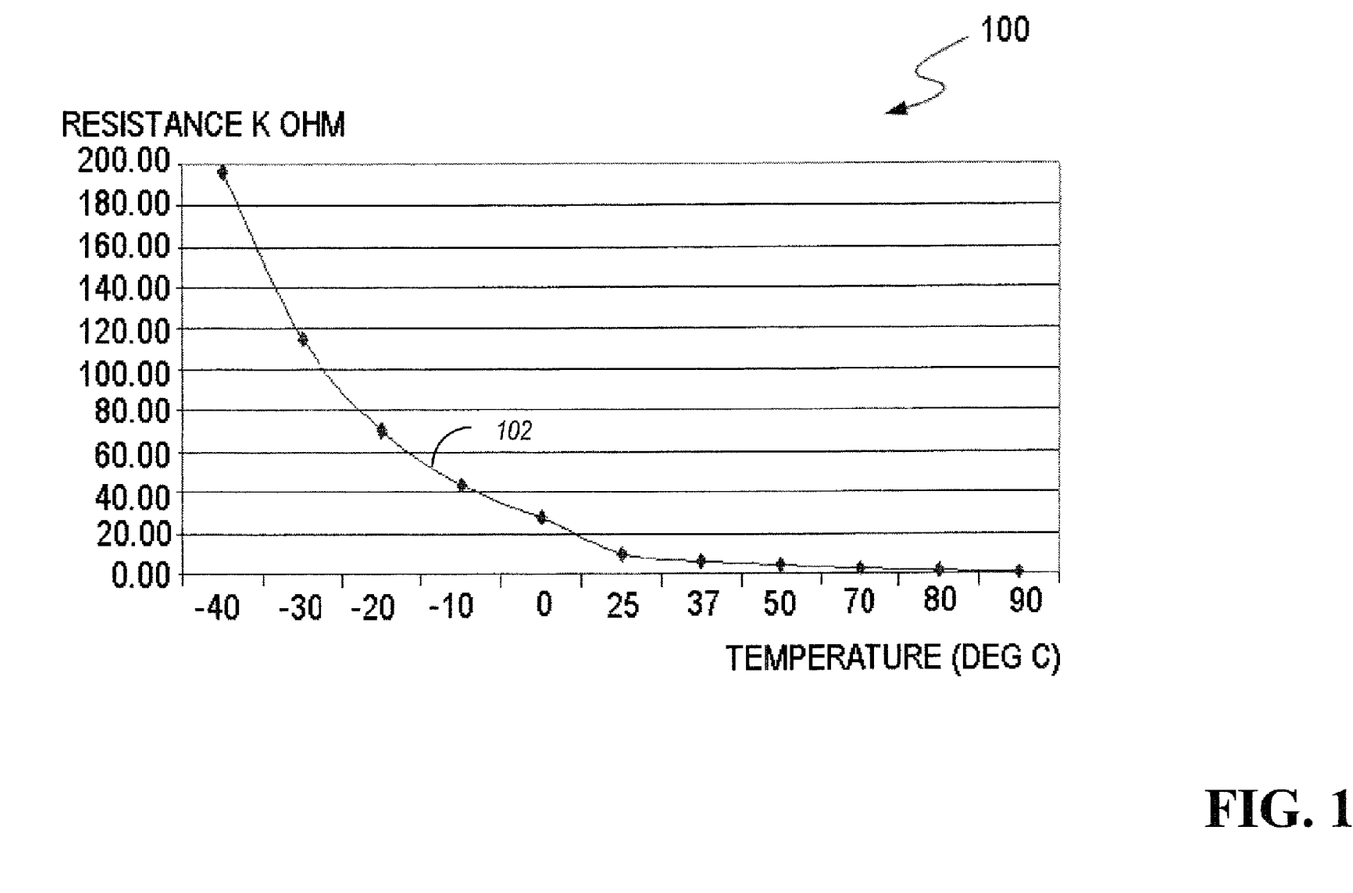
FIG. 1 is a characteristics graph illustrating a resistance versus temperature characteristics plot for an NTC thermistor.

FIG. 1 is a graph 100 illustrating a resistance versus temperature performance characteristics plot 102 for an NTC thermistor. As shown in the plot 102, the measured resistance of the NTC thermistor decreases as the temperature of the thermistor rises. The change in temperature—and, consequently, measured resistance—of the NTC thermistor is related to the change in temperature of the environment (environmental temperature). The general operating characteristics of the NTC thermistor as illustrated in the graph 100 will be assumed throughout the application.

Figure 2:
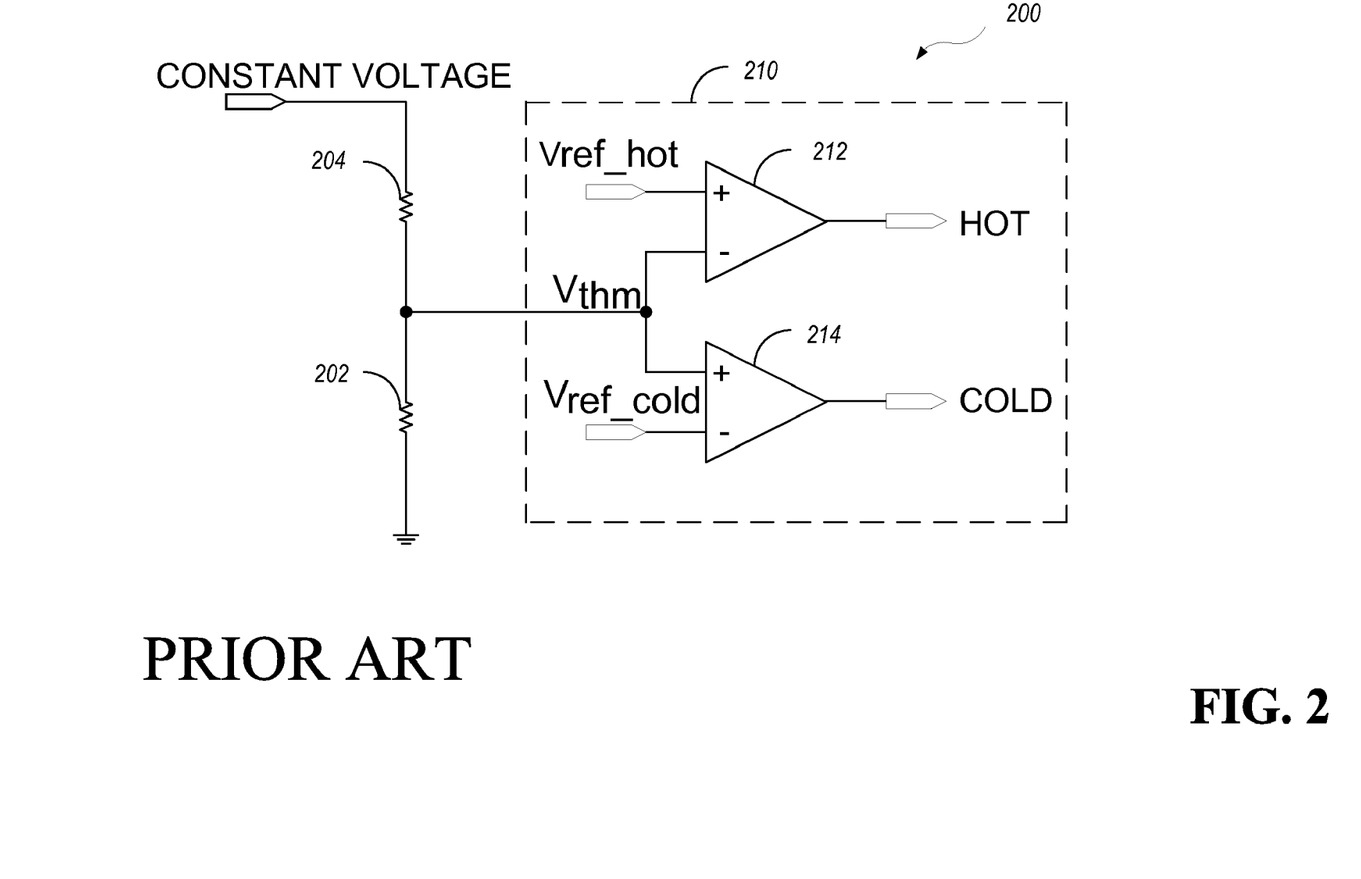
FIG. 2 is a circuit diagram illustrating a thermistor measurement block with a constant voltage source.

FIG. 2 illustrates a typical thermistor measurement block 200 with a constant voltage source. A resistor divider in FIG. 2 includes a thermistor 202 and a resistor 204 coupled to each other in series, and a window comparator 210. The window comparator 210 consists of two comparators 212 and 214 with two reference voltages Vref_hot and Vref_cold, respectively. Using the window comparator 210, a thermistor voltage (Vthm) is compared with Vref_hot and Vref_cold. When Vthm<Vref_hot, or Vthm>Vref_cold, the output of the window comparator 210 will indicate that an undesirable over-temperature or under-temperature condition, respectively, has occurred. The output may be used to actuate a corresponding circuit to perform an action, such as a thermal protection action. For example, a particular circuit that is designed to protect the system from temperature extremes can be activated. Similarly, the output from the window comparator 210 may also be used to deactivate particular circuits.

Figure 3:
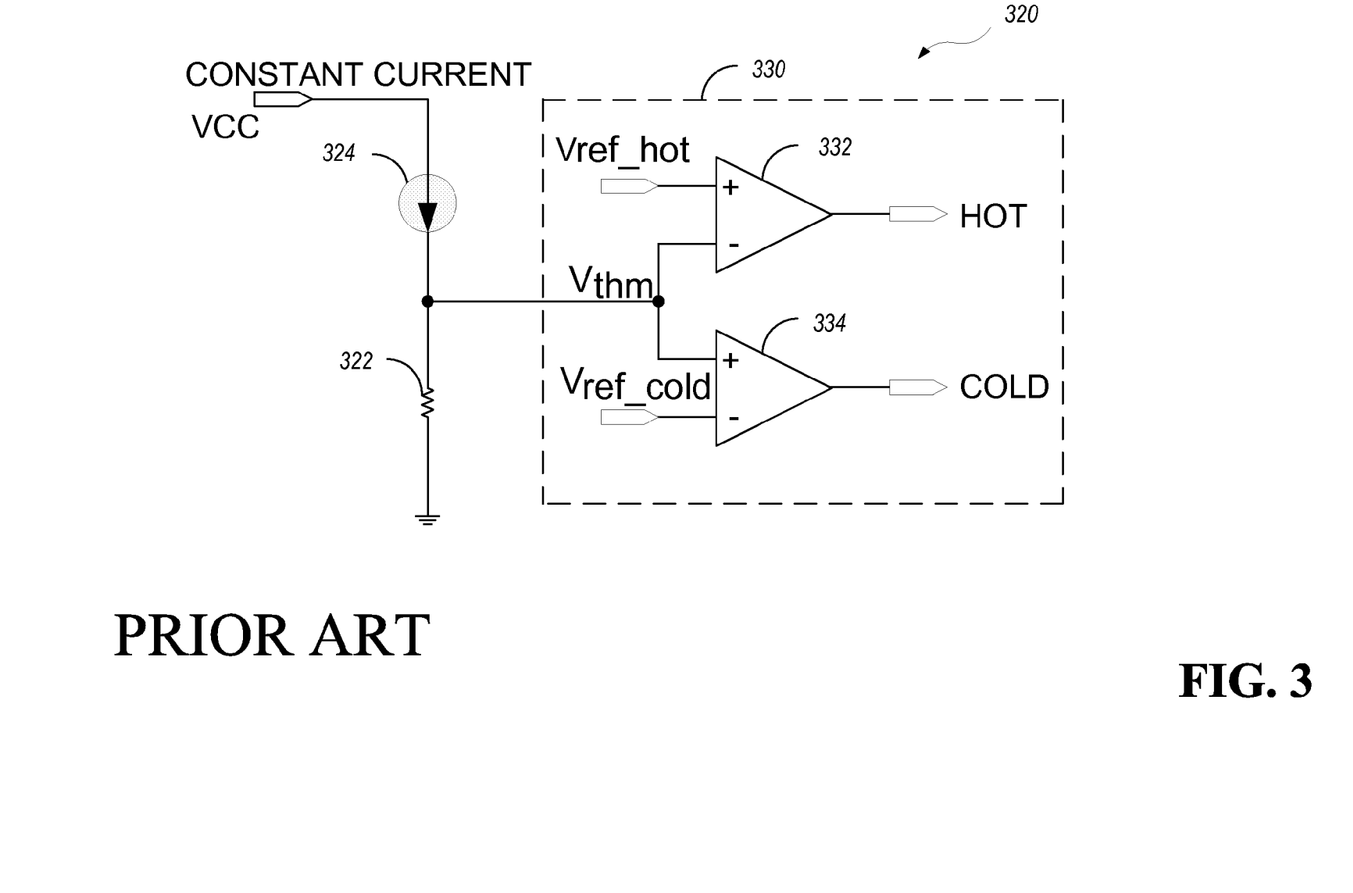
FIG. 3 is a circuit diagram illustrating a thermistor measurement block with a constant current source.

FIG. 3 illustrates a typical thermistor measurement block 320 with a constant current source 324. The constant current source 324 provides a constant current flowing through a thermistor 322 to produce a voltage that is proportional to a measured resistance of the thermistor 322. A window comparator 330 consists of two comparators 332 and 334 with two reference voltages Vref_hot and Vref_cold, respectively. Similar to the thermistor measurement block 200 of FIG. 2, a thermistor voltage (Vthm) of the thermistor 322 is compared with Vref_hot and Vref_cold by means of the window comparator 330 for detecting undesirable temperature conditions.

The wide range of temperature fluctuation that may be experienced by the thermistors of either FIG. 2 or FIG. 3, however, may not allow a sufficiently high accuracy of measurement—especially when the temperature of the particular thermistor reaches a particularly high level. For example, when the temperature increases past 37° in FIG. 1, the NTC thermistor only provides a small amount of resistance. As the current flowing through the particular thermistor is constant, the voltage across the thermistor Vthm will be proportional to the level of resistance. This input voltage level, which may reach millivolt levels, will be too low as compared to the comparator offset range and noise that may be present in the circuit. In this circumstance, the comparator cannot output an accurate value in response to the input. Furthermore, the thermistor measurement block 200 shown in FIG. 2, may have high current consumption when the resistance of the thermistor 202 reaches a low level due to the use of the resistor divider.

Figure 4:
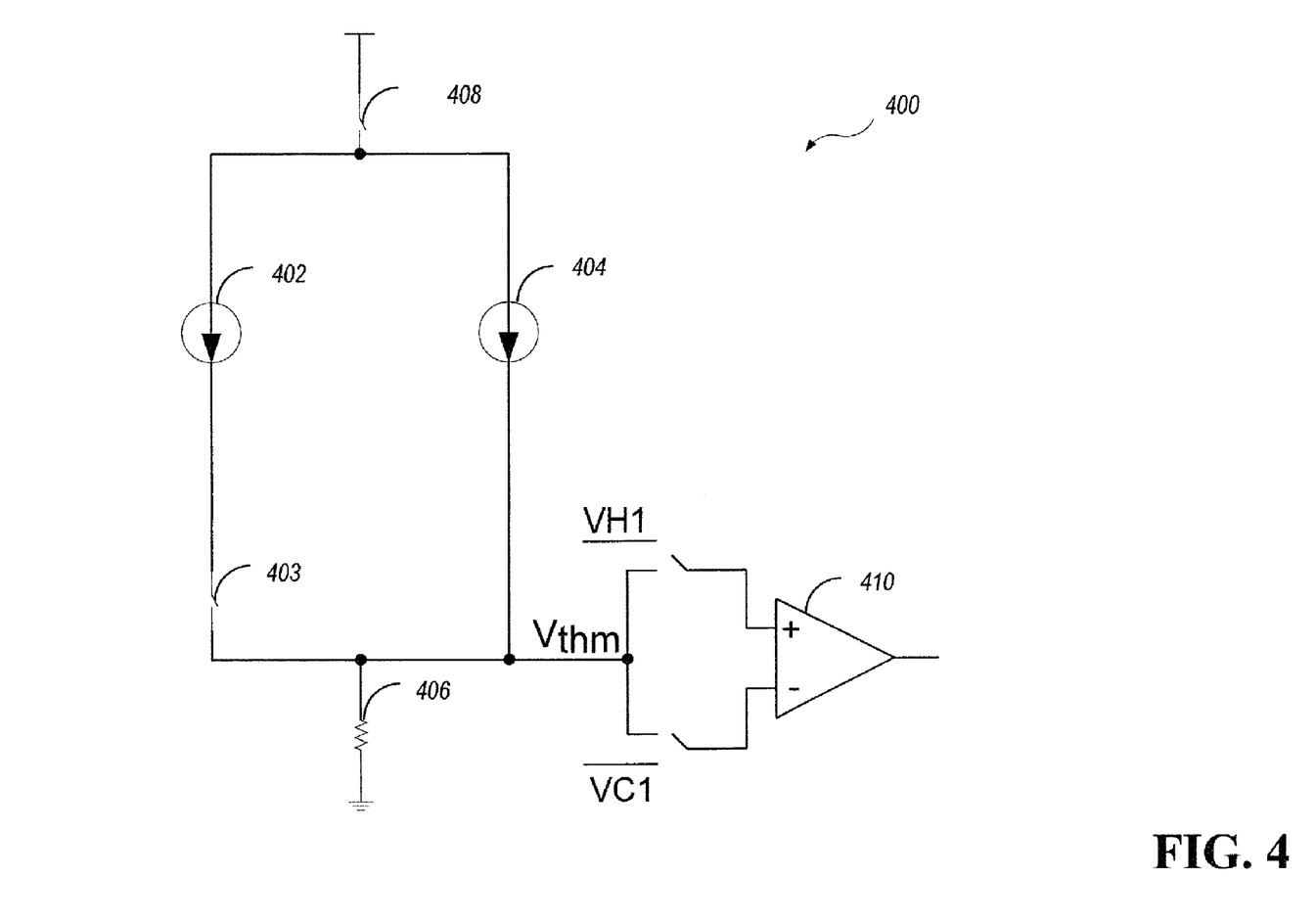
FIG. 4 is a circuit diagram illustrating an auto-ranging thermistor temperature detection circuit configured in accordance with one embodiment of the present invention.

FIG. 4 is a circuit diagram illustrating an auto-ranging thermistor temperature detection circuit 400 configured in accordance with one embodiment of the present invention. The auto-ranging thermistor temperature detection circuit 400 includes switches 403 and 408, a "hot" current source 402, a "cold" current source 404, a thermistor 406, and a comparator 410.

The switch 408 can be used to control an external power supply (not shown for brevity and clarity of description) for supplying power to the auto-ranging thermistor temperature detection circuit 400. Since the timing of the thermal variation to be detected may be slow in some applications, the switch 408 can be operated in a periodical fashion to reduce overall power consumption of the auto-ranging thermistor temperature detection circuit 400. For example, a clock signal may be provided by a timer (not shown for brevity and clarity of description) to control the switch 408. Preferably, an "on" time of the clock signal is related to a minimum settling time of the auto-ranging thermistor temperature detection circuit 400. In other words, the duty cycle of the circuit should be at least as long as the settling time of the circuit.

The thermistor 406 is coupled to a junction of the current sources 402 and 404. The thermistor 406 can be any thermally sensitive resistor that has a resistance characteristic that varies with temperature. In one embodiment, the thermistor 406 can be an NTC-type thermistor. In another embodiment, a PTC-type thermistor may also be used without departing from the spirit or the scope of the present invention.

The internal current sources 402 and 404, coupled to each other in parallel, can be used to improve in the accuracy of the sensing of the temperature of the thermistor 406 in a high-temperature (e.g., over-temperature) situation and a low-temperature (e.g., under-temperature) situation, and dynamically and automatically supplying current to the thermistor 406 in response to a particular range in temperature. In one embodiment, when the switch 408 is turned on, the cold current source 404 is supplied to the thermistor 406. The hot current source 402, controlled by the switch 403, will be turned on and off to supplement the cold current source 404, as further described herein.

For example, assuming that the thermistor 406 is an NTC-type thermistor, its resistance will fall when its temperature increases. Consequently, the voltage (Vthm) across the thermistor 406 will also decrease. When Vthm falls below a predetermined hot threshold (VH1), the hot current source 402 will be turned on with the switch 403. Assuming the temperature decreases, when Vthm rises above a predetermined cold threshold (VC1), which is higher than VH1, the current source 402 will be turned off. When Vthm is within the range of VH1 and VC1, the switch 403 will remain in the last state so as to keep the hot current source 402 on or off.

In another embodiment, if the thermistor 406 is a PTC-type thermistor and assuming that the temperature is decreasing, when Vthm falls below VH1, the hot current source 402 will be turned on with the switch 403. With the temperature increasing, when Vthm rises above the VC1, which is higher than VH1, the current source 402 will be turned off. When Vthm is within the range of VH1 and VC1, the switch 403 will remain in the last state so as to keep the hot current source 402 on or off.

Accordingly, the current flowing through an NTC-type thermistor or a PTC-type thermistor can be adjusted to improve the measurability of Vthm. Furthermore, the hot current source 402 can be controlled in a hysteresis mode as further discussed below for both NTC-type and PTC-type thermistors.

The auto-ranging thermistor temperature detection circuit 400 in FIG. 4 includes the comparator 410 for indicating an over-temperature or under-temperature condition. For the simplicity of the description, only one comparator is shown in FIG. 4. However, any number of comparators can be used based on different applications in accordance with various embodiments of the present invention.

Figure 5:
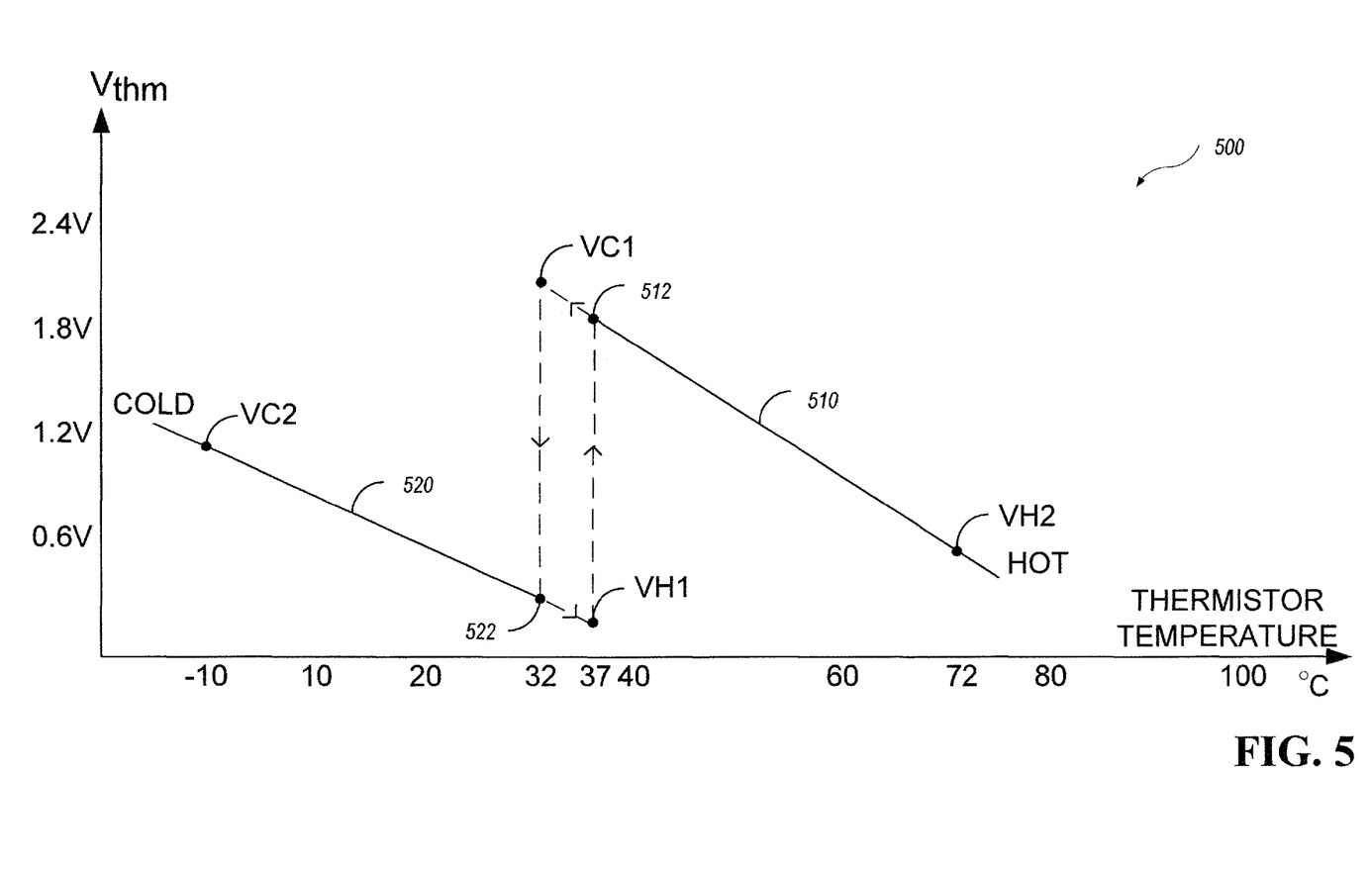
FIG. 5 is a characteristics graph illustrating a voltage versus temperature characteristics plot for an NTC thermistor in accordance with one embodiment of the present invention.

FIG. 5 is a characteristic graph 500 illustrating a voltage versus temperature characteristics plot for an NTC-type thermistor that, in accordance with one embodiment of the present invention, is used with the auto-ranging thermistor temperature detection circuit 400. Referring to FIG. 5 in combination with FIG. 4, the operation of the auto-ranging thermistor temperature detection circuit 400 will be described in an embodiment where the NTC-type thermistor is the thermistor 406.

The graph 500 includes a hot line 510 and a cold line 520. Initially, when the circuit 400 is turned on, the cold current source 404 supplies current to the thermistor 406 and, if the temperature is low (e.g., 0°), the illustration of the operation of the thermistor 406 will fall on the cold line 520. Assuming the temperature of the thermistor 406 increases, the resistance of the thermistor 406 will decrease and, as a result, Vthm decreases. Vthm will lower to a hot threshold VH1 (e.g., 0.2V) when the temperature increases to a certain level (e.g., 37°). As discussed with respect to FIG. 4, when Vthm drops below the hot threshold VH1, the switch of 403 for the hot current source 402 will be turned on to supply current to the thermistor 406. As such, both the cold current source 404 and the hot current source 402 will supply current to the thermistor 406. Thus, the amount of current flowing through the thermistor 406 is increased, increasing Vthm. In this situation, the illustration of the operation of the thermistor 406 is transferred from VH1 (e.g., 0.2V) on the cold line 520 to a point 512 (e.g., 1.848V) on the hot line 510 of the graph 500.

When the temperature fluctuates in a small range, such as within 5°, around the point 512, a hysteresis mode can be applied to prevent the switch 403 from being rapidly closed and opened, as further described herein. Where Vthm is greater than the voltage value of the point 512 (e.g., 1.848V), but lower than a cold threshold VC1 (e.g., 2.2V), the auto-ranging thermistor temperature detection circuit 400 can still operate between VC1 and the point 512 on the hot line 510. When Vthm is lower than the voltage value of the point 512 and assuming there is an increase in temperature, the illustration of the operation of the thermistor 406 will continue to progress along the hot line 510. If the temperature further increases to an over-temperature level (e.g., 72°) and the corresponding Vthm value reaches an over-temperature threshold VH2 (e.g., 0.6V) on the hot line 510, an over-temperature signal will be asserted. In a case where the auto-ranging thermistor temperature detection circuit 400 is used in a system for protecting temperature sensitive devices, a protection circuit (not shown in FIG. 4 for purposes of brevity and clarity) can be enabled in response to the over-temperature signal for performing over-temperature protection actions. Alternatively, or simultaneously, certain circuits may be switched off, such as circuits that may be contributing to the heat generation.

Operating in an environment with decreasing temperature, Vthm rises over the cold threshold VC1 (e.g., 2.2V) as the corresponding temperature drops to a certain level (e.g., 32°) in the graph 500. When Vthm is greater than the cold threshold VC1, the hot current source 402 will be turned off. As current flowing through the thermistor 406 decreases, Vthm decreases. In this situation, the illustration of the operation of the thermistor 406 in the graph 500 is transferred from VC1 (e.g., 2.2V) on the hot line 510 to a point 522 (e.g., 0.244V) on the cold line 520. The previously mentioned hysteresis mode can also be applied to prevent the switch 403 from being rapidly closed and opened constantly if the temperature slightly fluctuates around the point 522. When Vthm is lower than the voltage value of the point 522 (e.g., 0.244V), but greater than the hot threshold VH1 (e.g., 0.2V), the auto-ranging thermistor temperature detection circuit 400 can still operate between VH1 and the point 522 on the cold line 520 even when the temperature slightly increases. When Vhtm is greater than the voltage value of the point 522 and there is a further drop in temperature, the illustration of the operation of the thermistor 406 in the graph 500 will continue to travel along the cold line 520. If the temperature further falls to an under-temperature level (e.g., −10°) and the corresponding Vthm value reaches an under-temperature threshold VC2 (e.g., 1.2V) in the graph 500, an under-temperature signal will be asserted. Again, in a case where the circuit 400 is a part of a temperature monitoring and protection system, a protection circuit (not shown in FIG. 4 for purposes of brevity and clarity) can be operated in response to the under-temperature signal for performing under-temperature protection actions.

Figure 6:
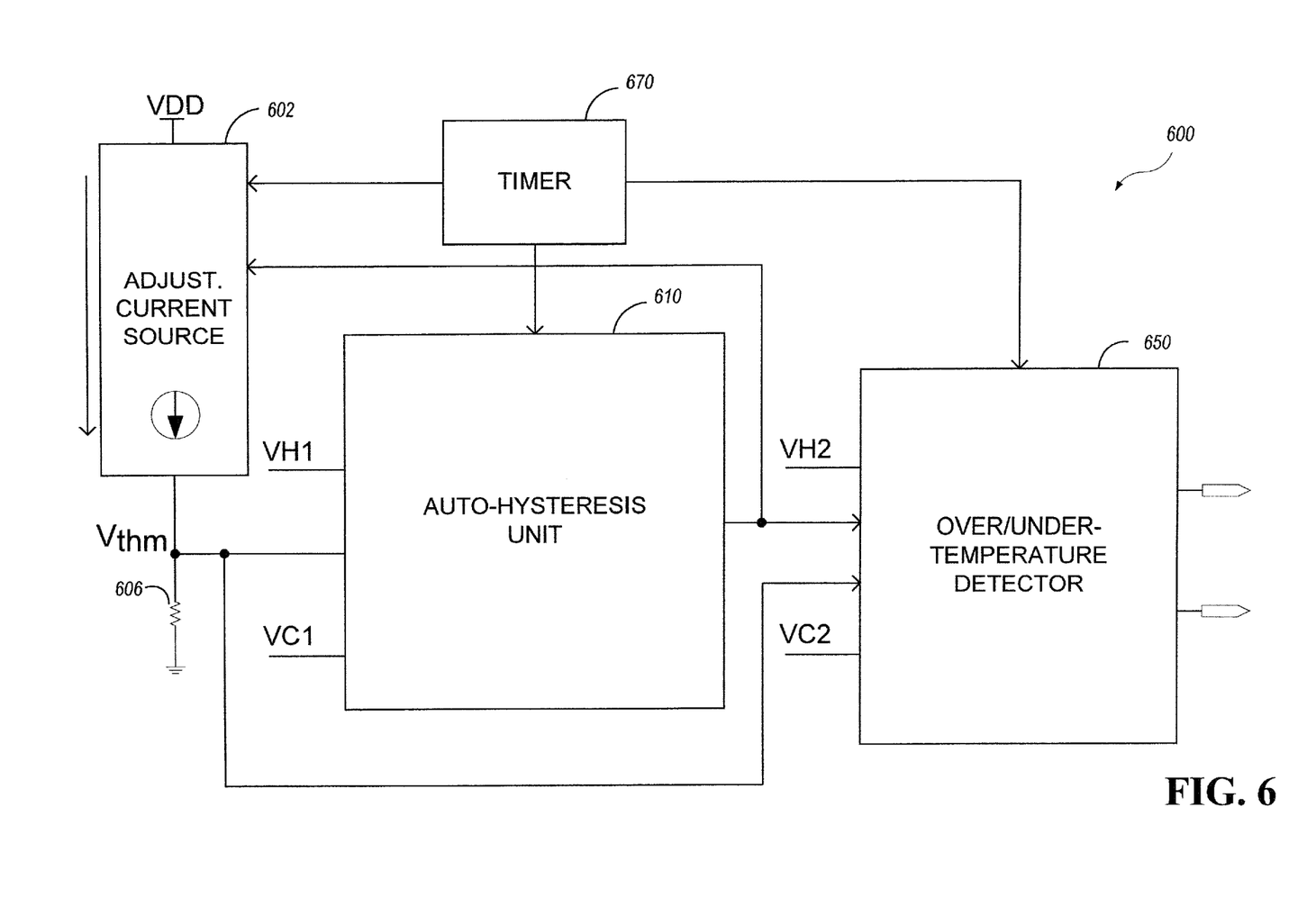
FIG. 6 is a block diagram illustrating a thermal detection system configured, in accordance with one embodiment of the present invention, with a constant current source.

FIG. 6 illustrates a thermal detection system 600, configured in accordance with one embodiment of the present invention, for a constant current source application. The thermal detection system 600 includes an auto-hysteresis feature. As shown in FIG. 6, the thermal detection system 600 may include an adjustable current source 602, a thermistor 606, an auto-hysteresis unit 610, and an over/under temperature detector 650. In addition, the thermal detection system 600 includes a timer 670 to provide a power conservation feature, as further described herein.

The adjustable current source 602 is coupled in series with the thermistor 606 and may provide, depending on the full range of operating temperatures over which the thermal detection system 600 will be operated, at least two different current levels to the thermistor 606. The thermistor 606 may be any thermally sensitive resistor that has a resistance that varies with temperature. The thermistor 606 can be either a NTC-type or PTC-type thermistor. The auto-hysteresis unit 610 is configured to control the adjustable current source 602 in a hysteresis mode. The over/under temperature detector 650 is configured to output an over-temperature signal or an under-temperature signal when the temperature exceeds a predetermined threshold.

The timer 670 includes a clock that generates a signal to control the operation of the adjustable current source 602, the auto-hysteresis unit 610, and the over/under temperature detector 650. In one preferred embodiment, the timer 670 will periodically turn on the system to provide the temperature detection feature, with the period chosen such that settling time of the various circuits will be accounted for such that an accurate reading may be obtained. Further, the timing provided by the timer 670 will take into account the possible rate of temperature change so that rapid changes in temperature may be detected. The frequency and duty cycle of the timing signal provided by the timer 670 can thus be chosen based on the implementation.

Continuing to refer to FIG. 6, the auto-hysteresis unit 610 monitors a voltage Vthm at the junction between the adjustable current source 602 and the thermistor 606 and compares Vthm to a first hot threshold voltage VH1 and a first cold threshold voltage VC1. By monitoring Vthm, the auto-hysteresis unit 610 can control/adjust the current flow from the adjustable current source 602 depending on the temperature.

If, for example, the thermistor 606 is an NTC-type thermistor, when Vthm drops below the hot threshold VH1 (e.g., 0.2V), the auto-hysteresis unit 610 will adjust the adjustable current source 602 to supply additional current to the thermistor 606. As a result, the current flowing through the thermistor 606 is increased, causing Vthm to increase. In this situation, the illustration of the operation of the thermistor 606 is transferred from VH1 (e.g., 0.2V) on the cold line 520 to a point 512 (e.g., 1.848V) on the hot line 510 of the graph 500 as represented in FIG. 5. With a further increase in temperature, the illustration of the operation of the thermistor 606 will continue to travel along the hot line 510. Around the point 512, however, even if the temperature slightly fluctuates when the adjustable current source 602 is supplying additional current, the auto-hysteresis unit 610 can maintain the adjustable current source 602 at a constant current to prevent frequent variations in current flow to the thermistor 606.

On the other hand, when Vthm rises over a cold threshold VC1 (e.g., 2.2V), the auto-hysteresis unit 610 can adjust the adjustable current source 602 to decrease the current flow through the thermistor 606, decreasing Vthm. In this situation, the illustration of the operation of the thermistor 606 is transferred from VC1 (e.g., 2.2V) on the hot line 510 to a point 522 (e.g., 0.244V) on the cold line 520, as represented in FIG. 5. With a further drop in temperature, the illustration of the operation of the thermistor 606 on the graph 500 will continue to travel along the cold line 520. Even if the temperature slightly fluctuates around the point 522, the auto-hysteresis unit 610 can maintain the adjustable current source 602 at a constant current to prevent frequent variations in current flow to the thermistor 606.

Accordingly, in one embodiment, the current through the thermistor can be adjusted dynamically and automatically to maintain the operation of the thermistor over a wide range of temperatures. More specifically, for an NTC-type thermistor, when the temperature is relatively high, a relatively high current will flow though the thermistor to increase the voltage drop across the thermistor. When the temperature is relatively low, a relatively low current will flow through the thermistor to reduce the voltage drop across the thermistor. For a PTC-type thermistor, when the temperature is relatively low, a relatively high current will flow through the thermistor. When the temperature is relatively high, a relatively low current will flow through the thermistor. Advantageously, a more accurate thermal measurement can be achieved.

As shown in FIG. 6, the over/under temperature detector 650 senses Vthm and compares Vthm to a second hot voltage threshold VH2 and a second cold threshold voltage VC2. The over/under temperature detector 650 can trigger a temperature protection circuit (not shown) when extreme temperatures are detected. In describing the example of the operation of thermal detection system 600, the relationship of voltages VH1, VH2, VC1 and VC2 is assumed as follows: VH1<VH2<VC2<VC1.

Again, assuming the thermistor 606 is an NTC-type thermistor, its resistance will be inversely proportional to temperature. With increasing temperature, the voltage across the thermistor 606 will decrease when a constant current flows through the thermistor 606. When the temperature increases, such that Vthm<VH1, current flowing through the thermistor 606 will increase. If Vthm<VH2 when the temperature is increasing, an over-temperature condition is detected.

With decreasing temperature, the voltage drop across the thermistor 606 increases. When the temperature decreases such that Vthm>VC1, the current flowing through the thermistor 606 will be decreased. If Vthm>VC2 when the temperature is decreasing, an under-temperature condition is detected.

In accordance with embodiments of the present invention, variations of the thermal detection system 600 can be applied to any system regardless of the complete range of temperature under which the thermal detection system is to be operated. For example, when the temperature rises to 80°, another auto-hysteresis unit, which may be similar to the auto-hysteresis unit 610, can be added to adjust a current through the thermistor 606 dynamically and automatically in response to a change in temperature.

Figure 7:
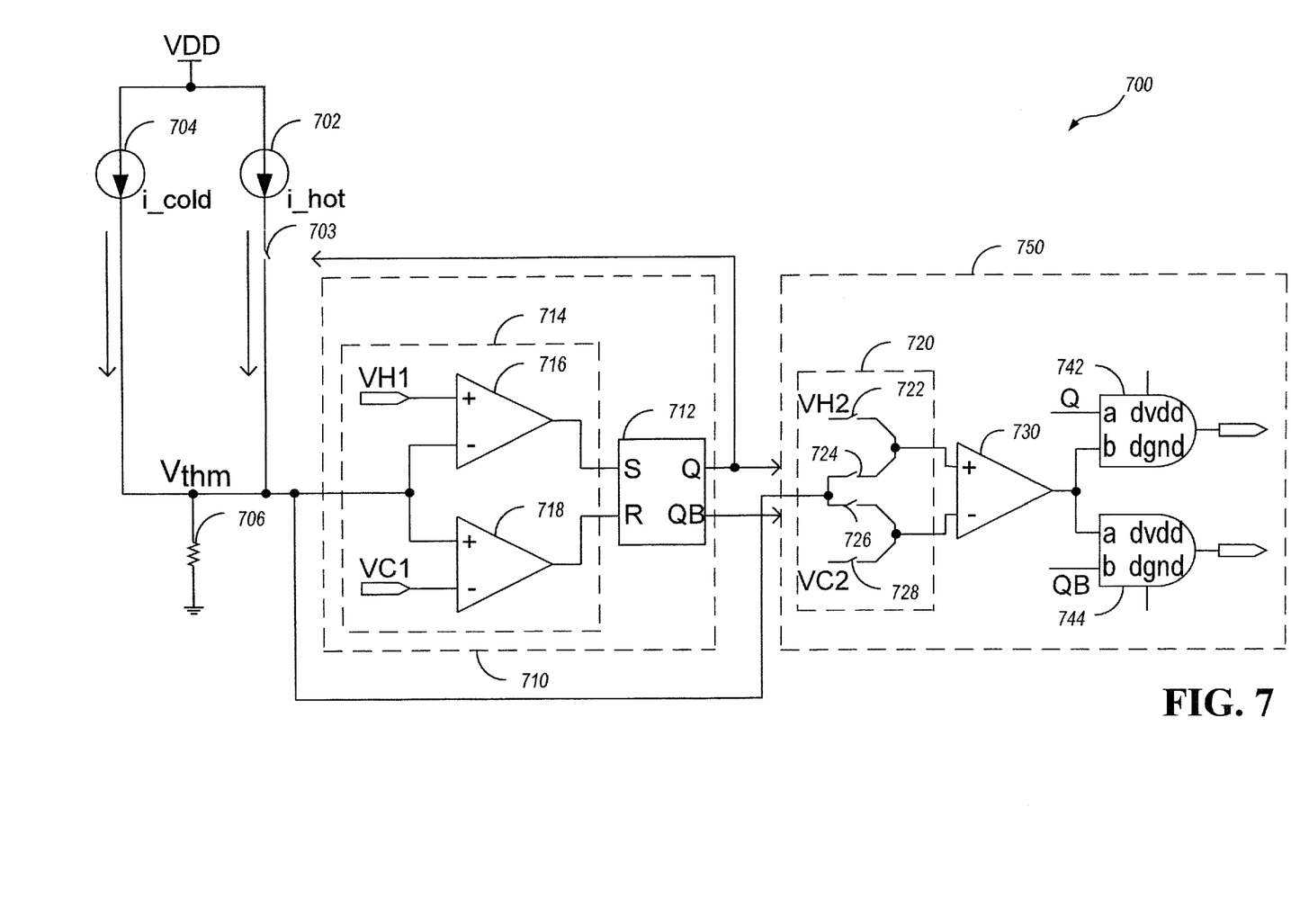
FIG. 7 is a circuit diagram illustrating a thermal detection circuit configured to implement the thermal detection system of FIG. 6 in accordance with one embodiment of the present invention.

FIG. 7 is a circuit diagram showing a thermal detection circuit 700 configured to implement the thermal detection system 600 of FIG. 6 in accordance with one embodiment of the present invention. The thermal detection circuit 700 includes an auto-range hysteresis logic 710 to control a hot current source 702 in a hysteresis mode, and an over-temperature/under-temperature detection block 750 to output an over-temperature signal or an under-temperature signal when the determined temperature reaches predetermined thresholds, in one embodiment.

For purposes of clarity and brevity, elements of the thermal detection circuit 700 similar to those of the thermal detection system 600 shown in FIG. 6 will not be described hereinafter in detail. Further, elements such as the timer 670 will not be described herein as it should be clear that the timer 670 may be usable with the thermal detection circuit 700.

The auto-range hysteresis logic 710 of the thermal detection circuit 700 includes an SR flip-flop 712 and a window comparator 714, in one embodiment. The window comparator 714 includes two comparators 716 and 718. The comparator 716 respectively receives, as inputs, a signal of a hot threshold voltage (VH1) and a voltage drop across the thermistor 706 (Vthm) at its positive and negative inputs, respectively. The comparator 718 respectively receives, as inputs, a signal of a cold threshold voltage (VC1) and Vthm at its negative and positive inputs, respectively.

The SR flip-flop 712 is an arrangement of logic gates that has a set input (S), a reset input (R), and outputs (Q) and (QB). The outputs of the window comparator 714 are respectively coupled to the set input and the reset input (R) of the SR flip-flop 712. When the reset input is set to a LOW level, and the set input is set to a HIGH level, the output Q will be triggered to a HIGH level; when the reset input is set to a HIGH level, and the set input is set to a LOW level, the output Q will be triggered to a LOW level; and when the reset input and set input are both set to LOW levels, the output Q will maintain the last state.

Through the use of the auto-range hysteresis logic 710, the current flowing through the thermistor 706 can be controlled/adjusted in a hysteresis mode according to the temperature. With reference to FIG. 5, assuming the thermistor 706 is an NTC-type thermistor as an example, when Vthm drops below a hot threshold VH1 (e.g., 0.2V), the window comparator 714 outputs a HIGH level signal to the set input of the SR flip-flop 712. The output Q of the SR flip-flop 712 is set to a HIGH level in response to the set input. The switch 703 controlled by the output Q is closed, and the hot current source 702 is turned on to supply current to the thermistor 706. As such, both the cold current source 704 and the hot current source 702 will supply current to the thermistor 706. The current flowing through the thermistor 706 is thus increased, and the Vthm is increased. In this situation, the illustration of the operation of the thermistor 706 in the graph 500 is transferred from VH1 (e.g., 0.2V) on the cold line 520 to a point 512 (e.g., 1.848V) on the hot line 510, as represented in FIG. 5. With a further increase in temperature, the illustration of the operation of the thermistor 706 in the graph 500 will continue to travel along the hot line 510. However, around the point 512, if the temperature slightly fluctuates when the hot current source 702 is just turned on, the hysteresis mode can be applied to prevent the switch 703 from rapidly and constantly being closed and opened. When Vthm is greater than the voltage value of the point 512 (e.g., 1.848V) but lower than VC1 (e.g., 2.2V), if the temperature slightly decreases, the window comparator 714 outputs LOW level signals to both the set and reset inputs of the SR flip-flop 712. In response to the set and reset inputs, the output Q will maintain the HIGH level so as to keep the switch 703 closed.

On the other hand, when Vthm rises over a cold threshold VC1 (e.g., 2.2V), the window comparator 714 outputs a HIGH level signal to the reset input of the SR flip-flop 712. The output Q of the SR flip-flop 712 is set to a LOW level in response to the reset input. The switch 703 will be opened, and the hot current source 702 will be turned off. As such, only the cold current source 704 will supply current to the thermistor 706. As the current flowing through the thermistor 706 decreases, and Vthm will decrease. In this situation, the illustration of the operation of the thermistor 706 in the graph 500 is transferred from VC1 (e.g., 2.2V) on the hot line 510 to a point 522 (e.g., 0.244V) on the cold line 520, as represented in FIG. 5. With a further decrease in temperature, the illustration of the operation of the thermistor 706 in the graph 500 will continue to travel along the cold line 520. If the temperature slightly fluctuates around the point 522, when the hot current source 702 is just turned off, the hysteresis mode can be also applied to prevent the switch 703 from being closed and opened rapidly and constantly. When Vthm is lower than the voltage value of the point 522 (e.g., 0.244V) but greater than VH1 (e.g., 0.2V) when there is a slight increase in temperature, the window comparator 714 outputs LOW level signals to both the set and reset inputs of the SR flip-flop 712. In response to the set and reset inputs, the output Q will maintain the HIGH level so as to keep the switch 703 closed.

The over/under-temperature detection block 750 includes a switch MUX 720, a comparator 730, a hot AND gate 742 and a cold AND gate 744, in one embodiment. The switch MUX 720 is used to select inputs for the comparator 730. The switch MUX 720 includes four switches 722, 724, 726 and 728 that are operated by SR flip-flop 712. The switches 722 and 728 respectively couples an over-temperature threshold (VH2) and an under-temperature threshold (VC2) as possible inputs for the comparator 730. The switches 724 and 726 are used to couple Vthm to the inputs of the comparator 730. The switches 722 and 726 are controlled by the output Q. When the output Q is at a HIGH level, the switches 722 and 726 are closed, and the signals of VH2 and Vthm will be passed by the switch MUX 720 to the positive and negative inputs, respectively, of the comparator 730. On the other hand, when the output QB is at a HIGH level, the switches 724 and 728 are closed, and the signals of Vthm and VC2 will be passed by the switch MUX 720 to the positive and negative inputs, respectively, of the comparator 730.

The comparator 730, coupled to the switch MUX 720, receives the passed signals through positive and negative inputs, and compares the voltage values at these inputs. When the output Q is at a HIGH level, the positive input of the comparator 730 receives the VH2 signal, and the negative input of the comparator 730 receives the Vthm signal. When the output Q is at a LOW level, the positive input of the comparator 730 receives the Vthm signal, and the negative input of the comparator 730 receives the VC2 signal. Comparing the voltage value of the input signal received at the positive input with the voltage value of the input signal received at the negative input, when the voltage value of the positive input signal is greater than the voltage value of the negative input signal, the comparator 730 will output a HIGH level signal. Conversely, when the magnitude of the voltage values are reversed, the comparator 730 will output a LOW level signal.

The hot AND gate 742 and the cold AND gate 744 are coupled to the output of the comparator 730 for preventing false triggering, in one embodiment. The hot AND gate 742 is used to guard the output of the over-temperature signal, and the cold AND gate 744 is used to guard the output of the under-temperature signal. A protection circuit (not shown in FIG. 7for purposes of brevity and clarity) can be coupled to one or both of these ouptus in response to the over-temperature or under-temperature signal for reacting to the signals.

Referring to FIG. 7, in accordance with one embodiment of the present invention, the relationship of voltages VH1, VH2, VC1 and VC2 is assumed to be the same as for the thermal detection system 600 of FIG. 6, and is as follows: VH1<VH2<VC2<VC1. The output Q is initially set to be at a LOW level, in one embodiment.

Where the thermistor 706 is an NTC-type thermistor, its resistance is inversely proportional to temperature. With increasing temperature, the voltage across the thermistor 706 decreases when a constant current, for example, i_cold, flows through the thermistor 706. When the temperature increases such that Vthm<VH1, through the window comparator 714, the set input of the SR flip-flop receives a HIGH level signal and the output Q of the SR flip-flop 712 is set to a HIGH level so as to turn on the switch 703. As such, the hot current source 702 will be turned on and the current flowing through the thermistor 706 will be changed to the combination of i_hot and i_cold. When the output Q is set to a HIGH level, the switch MUX 720 couples VH2 and Vthm to the positive and negative inputs, respectively, of the comparator 730. If Vthm<VH2 when the temperature is increasing, the output of the comparator 730 is triggered to a HIGH level. In this situation, since the output Q is also at a HIGH level, the output of the hot AND gate 742 will be at a HIGH level, and the cold AND gate 744 will be in a LOW level. The hot AND gate 742 confirms that the over-temperature condition is detected and the over-temperature signal is outputted by the hot AND gate 742.

With decreasing temperature, the voltage drop across the thermistor 706 increases. When the temperature decreases such that Vthm>VC1, the reset input of the SR flip-flop 712 receives a HIGH level signal from the pair of window comparators 714 and the output Q of the SR flip-flop 712 is set to a LOW level so as to turn off the switch 703. As such, the current flowing through the thermistor 706 will be changed to i_cold. When the output Q is set to a LOW level, the switch MUX 720 couples Vthm and VC2 to the positive and negative inputs, respectively, of the comparator 730. If Vthm>VC2 when the temperature is decreasing, the output of the comparator 730 is triggered to a HIGH level. In this situation, since the output QB is also at a HIGH level, the output of the cold AND gate 744 will be at a HIGH level, and the output of the hot AND gate 742 will be at a LOW level. The cold AND gate 744 confirms that the under-temperature condition is detected and the under-temperature signal is outputted by the cold AND gate 744.

In accordance with other embodiments of the present invention, variations of the thermal detection circuit 700 can be applied to any thermal detection system regardless of the range of the temperature. For example, referring again to FIG. 5, when the temperature rises to 80°, another hysteresis logic, which may be similar to the auto-range hysteresis logic 710, can be added to adjust a current through the thermistor dynamically and automatically in response to a change in temperature.

Figure 8:
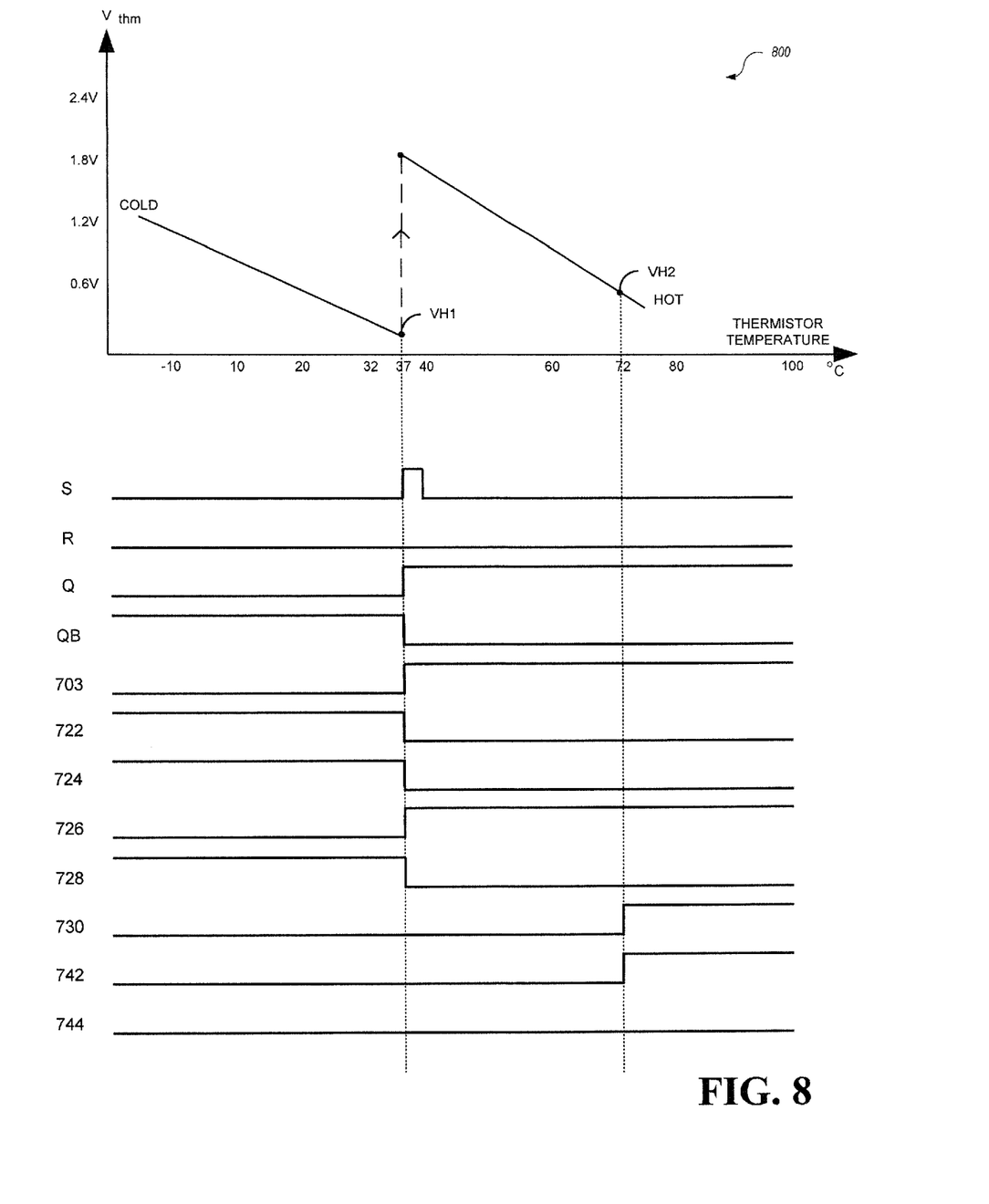
FIG. 8 is a timing diagram illustrating logic states of various components of the circuit diagram of FIG. 7 during a low-to-high temperature transition, in accordance with one embodiment of the present invention.

FIG. 8 contains a timing diagram 800 illustrating the logic states of various components of the circuit diagram of FIG. 7 during a low-to-high temperature transition, in accordance with one embodiment of the present invention. In particular, the following states are shown: the inputs and outputs of the SR flip-flop 712 (S, R, Q, QB); the states of switches 703, 722, 724, 726, 728; the outputs of the comparator 730; and the outputs of the AND gates 742 and 744.

Figure 9:
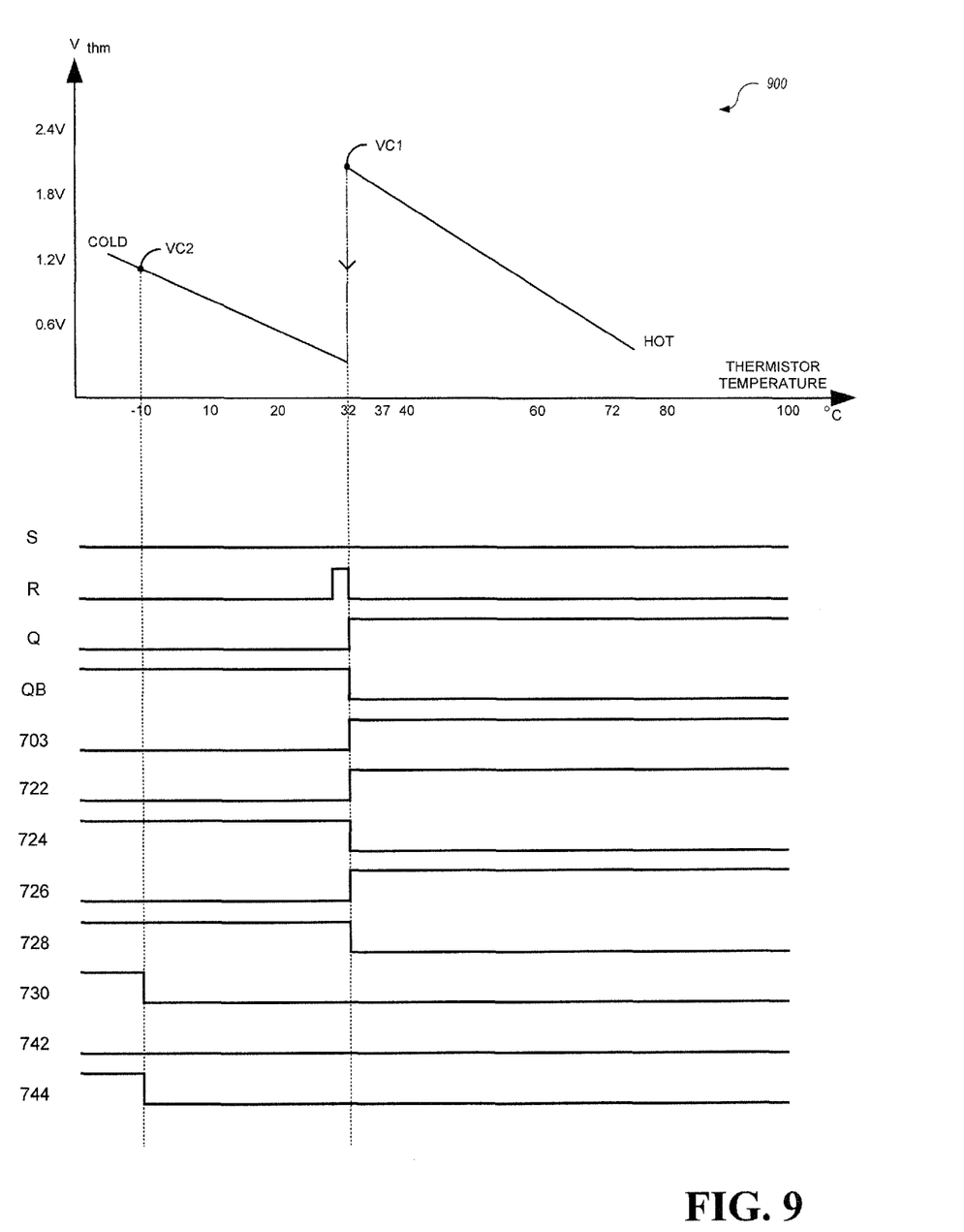
FIG. 9 is a timing diagram illustrating logic states of various components of the circuit diagram of FIG. 7 during a high-to-low temperature transition, in accordance with one embodiment of the present invention.

FIG. 9 is a timing diagram 900 showing logic states of the same components of FIG. 7 as indicated with respect to FIG. 8 during a high-to-low temperature transition, in accordance with one embodiment of the present invention.

Figure 10:
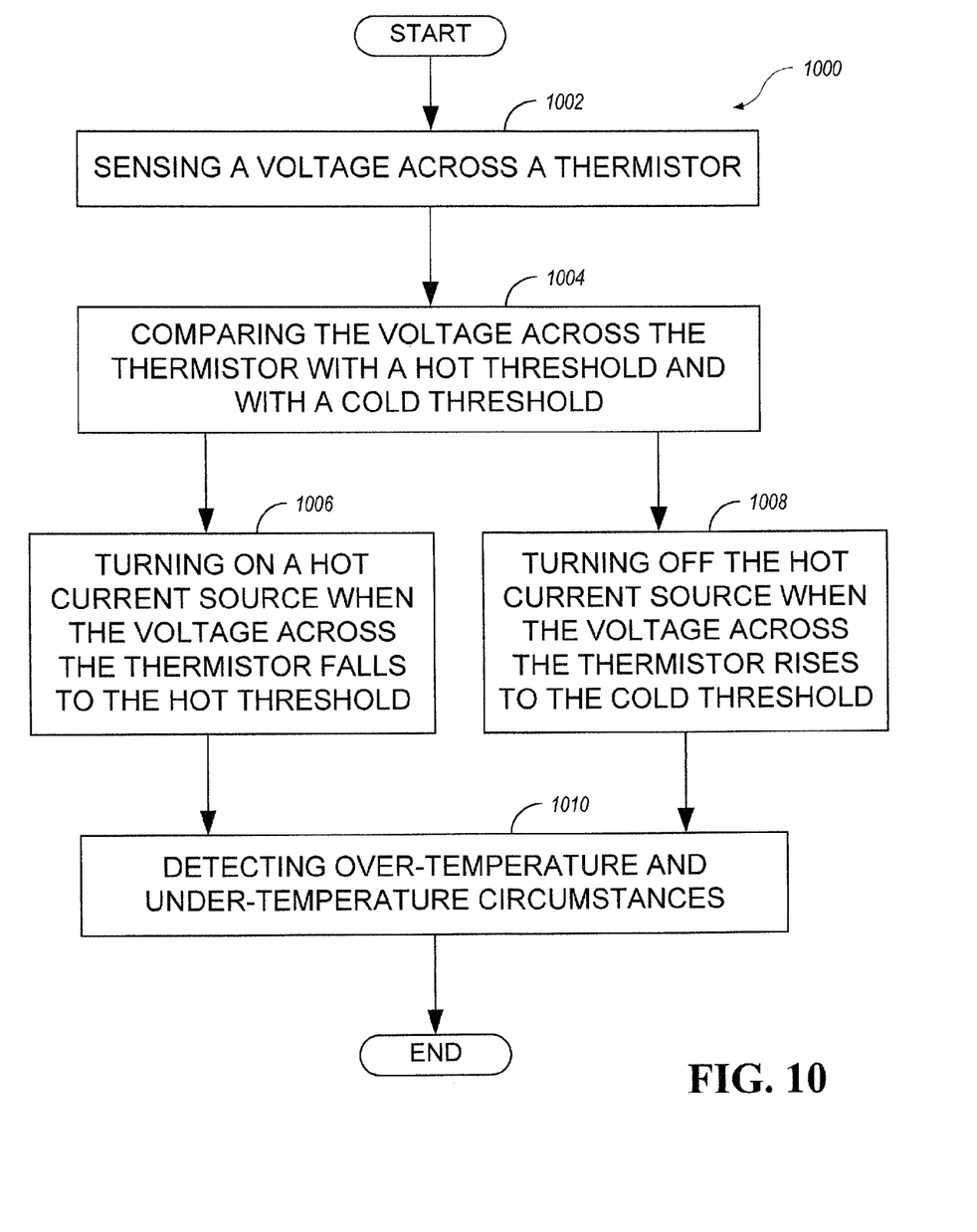
FIG. 10 is a flow chart illustrating an auto-ranging thermal detection process implemented in accordance with one embodiment of the present invention.

FIG. 10 illustrates a process 1000 for auto-ranging thermal detection, in accordance with one embodiment of the present invention. At 1002, a voltage (Vthm) across a thermistor is sensed for detecting the temperature based on the operational characteristics of the thermistor. The thermistor is coupled to a junction of a hot current source and a cold current source. The hot current source and the cold current source are coupled to each other in parallel for supplying a current to the thermistor.

At 1004, Vthm is compared with a hot threshold (VH1) and a cold threshold (VC1) such as by a window comparator. Vthm, VH1 and VC1 are inputted to the window comparator. According to a relationship between Vthm, VH1 and VC1, the window comparator outputs a HIGH level or a LOW level to an SR flip-flop.

At 1006, when Vthm falls to VH1, an output Q of the SR flip-flop is set to a HIGH level in response to the output of the window comparator. A switch coupled to the hot current source is controlled by the output Q. When the output Q is at a HIGH level, the switch is closed, and the hot current source is turned on in a hysteresis mode at 1006. In this circumstance, both the hot current source and the cold current source supply current to the thermistor. As such, Vthm is increases to a first predetermined voltage. However, during decreasing temperatures, if the value of Vthm fluctuates between VC1 and the first predetermined voltage, the set input and reset input of the SR flip-flop can both be set at a LOW level such that the output Q can maintain a HIGH level. Therefore, the switch can steadily be kept closed, and the hot current source is kept on to supply current.

At 1008, when Vthm rises to the VC1, the output Q of the SR flip-flop is set to a LOW level. When the output Q is at a LOW level, the switch controlled by the output Q is opened, and the hot current source is turned off in a hysteresis mode. In this circumstance, only the cold current source supplies current to the thermistor. As such, Vthm is decreases to a second predetermined voltage. However, during increasing temperatures, if the value of Vthm fluctuates between VH1 and the second predetermined voltage, the set input and reset input of the SR flip-flop can both be at LOW levels such that the output Q can maintain a LOW level. Therefore, the switch can steadily be kept open, and the hot current source is kept off.

At 1010, over-temperature and under-temperature situations are detected when said temperature is undesirable. A comparator is applied to compare Vthm with an over-temperature threshold (VH2) or with an under-temperature threshold (VC2). The comparator is coupled to a switch MUX which can select one of VC1 and VH2 to output to the comparator. The switch MUX is controlled by the output Q. For an NTC thermistor, when the output Q is at a HIGH level, the switch MUX outputs VH2 to the comparator to compare with Vthm. If Vthm is lower than VH2, an over-temperature signal can be outputted. On the other hand, when the output Q is at a LOW level, the switch MUX outputs VC2 to the comparator to compare with Vthm. If Vthm is greater than VC2, an under-temperature signal can be outputted. For a PTC thermistor, the over-temperature signal and the under-temperature signal can be outputted in a similar, but reversed, fashion.

Figure 11:
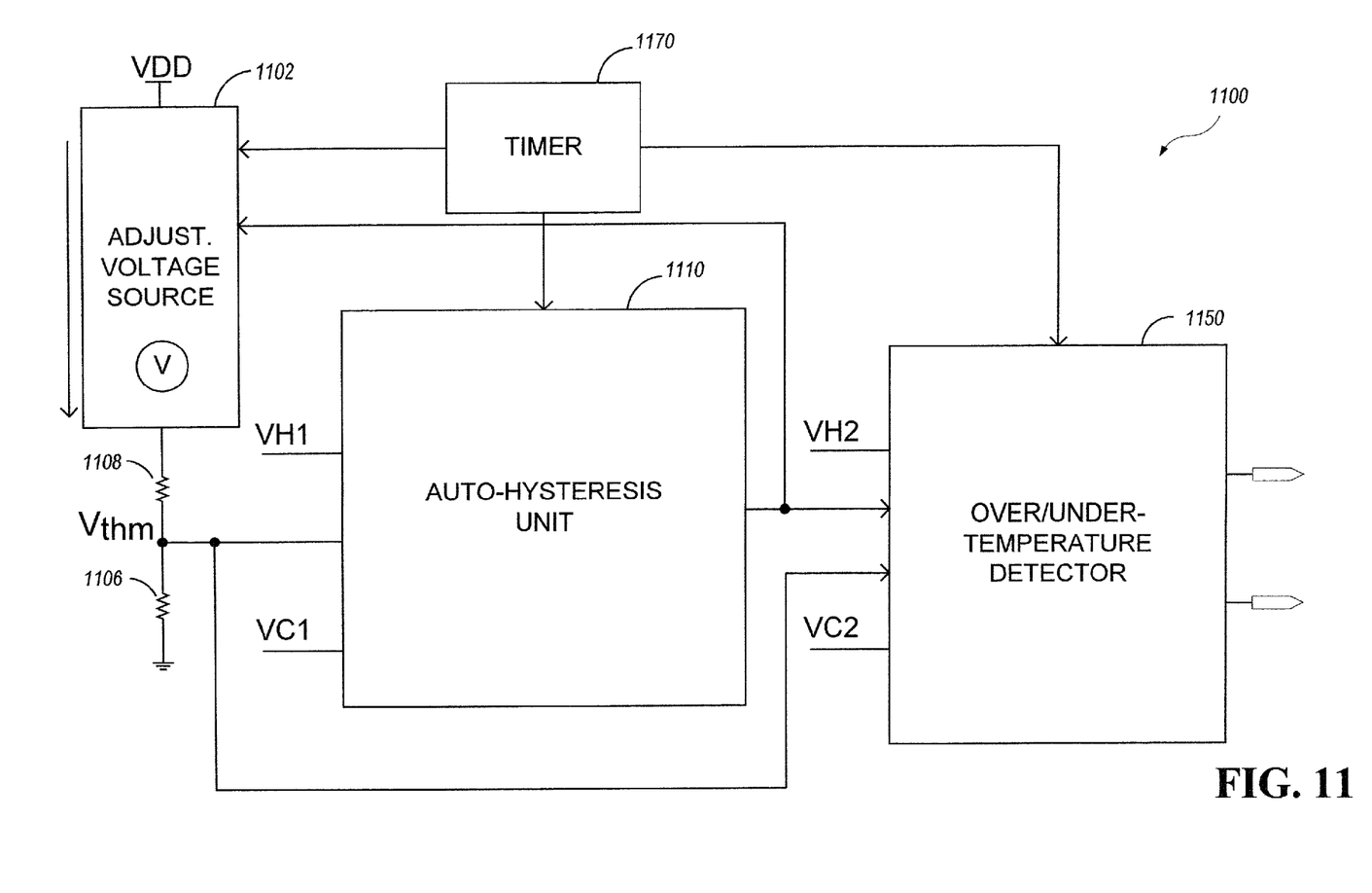
FIG. 11 is a block diagram illustrating a thermal detection system configured, in accordance with one embodiment of the present invention, with a constant voltage source.

FIG. 11 illustrates a thermal detection system 1100, configured in accordance with one embodiment of the present invention, for a constant voltage source application. Similar to the thermal detection system 600, the thermal detection system 1100 includes an auto-hysteresis feature. As shown in FIG. 11, the thermal detection system 1100 may include an adjustable voltage source 1102, a thermistor 1106, an auto-hysteresis unit 1110, and an over/under temperature detector 1150. In addition, the thermal detection system 1100 includes a timer 1170 to provide a power conservation feature, as described above.

The adjustable voltage source 1102 is coupled to a resistor ladder including a resistor 1108 coupled in series with the thermistor 1106 and may provide, depending on the full range of operating temperatures over which the thermal detection system 1100 will be operated, at least two different voltage levels to the thermistor 1106. The thermistor 1106 may be any thermally sensitive resistor that has a resistance that varies with temperature. The thermistor 1106 can be either a NTC-type or PTC-type thermistor. The auto-hysteresis unit 1110 is configured to control the adjustable voltage source 1102 in a hysteresis mode. The over/under temperature detector 1150 is configured to output an over-temperature signal or an under-temperature signal when the temperature exceeds a predetermined threshold. For purposes of clarity and brevity, elements of the thermal detection system 1100 similar to those of the thermal detection system 600 shown in FIG. 6 will not be described hereinafter in detail.

The thermal detection system 1100, being implemented with a constant voltage source, requires a second resistor (the resistor 1108) to create a resistor ladder with the thermistor 1106. This additional resistor will increase power consumption. Further, because the sensitivity of the thermal detection system 1100 is dependent on the resistor ladder, the variance of the operation of the resistor 1108 needs to be relatively low to ensure a particular level of accuracy. In general, however, the operation of the thermal detection system 1100 is similar to the thermal detection system 600 shown in FIG. 6 and described above.

The previous description is provided to enable any person skilled in the art to fully understand the full scope of the invention. Modifications to the various configurations disclosed herein will be readily apparent to those skilled in the art. Thus, the claims are not intended to be limited to the various aspects of the invention described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for detecting temperature, comprising:
   supplying at least one of a current and a voltage to a thermistor at a first level via an adjustable power source;
   sensing a thermistor voltage across said thermistor;
   comparing said thermistor voltage with a first threshold and with a second threshold;
   adjusting said at least one of said current and said voltage supplied to said thermistor by controlling said adjustable power source when said thermistor voltage reaches said second threshold; and
   maintaining said adjustable power source at a specific level even when said thermistor voltage fluctuates between said first threshold and a first predetermined voltage.

2. The method of claim 1, wherein said adjustable power source comprises a first current level and a second current level, and said adjusting comprises:
   adjusting said current supplied to said thermistor by supplying current to said thermistor at said second current level.

3. The method of claim 1, wherein said adjustable power source comprises a first voltage level and a second voltage level, said thermistor being coupled to a resistor in series to form a resistor ladder, and said adjusting comprises:
   adjusting said voltage supplied to said thermistor by supplying voltage to said resistor ladder at said second voltage level.

4. The method of claim 1, further comprising:
   outputting a signal according to said thermistor voltage, said first threshold, and said second threshold, wherein said signal is at a LOW level when said thermistor voltage reaches said first threshold, and said signal is at a HIGH level when said thermistor voltage reaches said second threshold; and
   controlling said adjustable power source based on said signal.

5. The method of claim 4, wherein said specific level comprises a second level, and wherein said adjusting comprises:
   increasing said at least one of said current and said voltage from said adjustable power source to said second level when said signal is at said HIGH level;
   supplying said increased at least one of said current and said voltage to said thermistor to increase said thermistor voltage to said first predetermined voltage.

6. The method of claim 4, wherein said controlling further comprises:
   decreasing said at least one of said current and said voltage from said adjustable power source to said first level when said signal is at said LOW level; and
   supplying said decreased at least one of said current and said voltage to said thermistor to decrease said thermistor voltage to a second predetermined voltage.

7. The method of claim 6, further comprising:
   maintaining said adjustable power source at said first level even when said thermistor voltage fluctuates between said second threshold and said second predetermined voltage.

8. The method of claim 4, wherein said thermistor comprises at least one of a negative temperature coefficient (NTC)-type thermistor and a positive temperature coefficient (PTC)-type thermistor.

9. The method of claim 8, wherein said thermistor is said NTC-type thermistor, further comprising:
   when said signal is at said HIGH level:
   comparing said thermistor voltage with an over-temperature threshold; and
   outputting an over-temperature signal when said thermistor voltage falls below said over-temperature threshold; and
   when said signal is at said LOW level:
   comparing said thermistor voltage with an under-temperature threshold; and
   outputting an under-temperature signal when said thermistor voltage rises above said under-temperature threshold.

10. The method of claim 8, wherein said thermistor is said PTC-type thermistor, further comprising:
    when said signal is at said LOW level:
    comparing said thermistor voltage with an over-temperature threshold; and
    outputting an over-temperature signal when said thermistor voltage rises above said over-temperature threshold; and
    when said signal is at said HIGH level:
    comparing said thermistor voltage with an under-temperature threshold; and
    outputting an under-temperature signal when said thermistor voltage falls below said under-temperature threshold.

11. An apparatus for detecting temperature, comprising:
an adjustable power source operable for supplying at least one of a current and a voltage;
a thermistor coupled to said adjustable power source; and
an auto-range hysteresis logic coupled to said thermistor and said adjustable power source, said auto-range hysteresis logic operable to compare said thermistor voltage with a first threshold and with a second threshold, output a signal to control said adjustable power source when said thermistor voltage reaches said second threshold, and maintain said adjustable power source at a specific level even when said thermistor voltage fluctuates between said first threshold and a first predetermined voltage.

12. The apparatus of claim 11, wherein said adjustable power source comprises a first power supply and a second power supply.

13. The apparatus of claim 11, wherein: (1) said adjustable power source is set to a first level in a hysteresis mode by said auto-range hysteresis logic when said thermistor voltage reaches said first threshold, and (2) said specific level comprises a second level, and said adjustable power source is set to said second level in said hysteresis mode by said auto-range hysteresis logic when said thermistor voltage reaches said second threshold.

14. The apparatus of claim 11, wherein said auto-range hysteresis logic comprises a first comparator operable for comparing said thermistor voltage with said first threshold and with said second threshold.

15. The apparatus of claim 14, wherein said first comparator comprises a window comparator.

16. The apparatus of claim 14, wherein said auto-range hysteresis logic comprises a flip-flop operable for outputting said signal to control said adjustable power source in response to said first comparator.

17. The apparatus of claim 16, wherein said flip-flop comprises an SR flip-flop.

18. The apparatus of claim 11, further comprising a temperature detection block coupled to said thermistor and operable to output at least one of an over-temperature signal and an under-temperature signal.

19. The apparatus of claim 18, wherein said temperature detection block comprises a switch MUX controlled by said signal outputted by said auto-range hysteresis logic operable to select and output at least one of an over-temperature threshold and an under-temperature threshold.

20. The apparatus of claim 19, wherein said temperature detection block comprises a second comparator coupled to said switch MUX operable for comparing said thermistor voltage with one of said at least one of said over-temperature threshold and said under-temperature threshold.

21. The apparatus of claim 11, further comprising a switch for controlling said adjustable power source, wherein said switch is capable of being operated in a periodic manner.

22. The apparatus of claim 11, wherein said thermistor comprises at least one of a positive temperature coefficient (PTC)-type thermistor and a negative temperature coefficient (NTC)-type thermistor.

* * * * *